(12) United States Patent
Schlegl et al.

(10) Patent No.: US 8,709,146 B2
(45) Date of Patent: Apr. 29, 2014

(54) THIN, PLATELET-SHAPED IRON PIGMENTS, PRODUCTION THEREOF AND USE THEREOF

(75) Inventors: Thomas Schlegl, Simmelsdorf (DE); Stefan Trummer, Nürnberg (DE)

(73) Assignee: Ostrolenk Faber LLP, Eckart GmbH (DE)

( * ) Notice: Subject to any disclaimer, the term of this patent is extended or adjusted under 35 U.S.C. 154(b) by 407 days.

(21) Appl. No.: 12/990,256

(22) PCT Filed: May 26, 2009

(86) PCT No.: PCT/EP2009/003727
§ 371 (c)(1),
(2), (4) Date: Nov. 5, 2010

(87) PCT Pub. No.: WO2009/144005
PCT Pub. Date: Dec. 3, 2009

(65) Prior Publication Data
US 2011/0048276 A1 Mar. 3, 2011

(30) Foreign Application Priority Data

May 26, 2008 (EP) .................................. 08009556

(51) Int. Cl.
*C09C 1/24* (2006.01)
*C23C 24/00* (2006.01)

(52) U.S. Cl.
USPC ............................ 106/456; 106/457; 427/205

(58) Field of Classification Search
USPC .......... 106/31.6, 457, 403; 427/205, 213, 214
See application file for complete search history.

(56) References Cited

U.S. PATENT DOCUMENTS

| | | | |
|---|---|---|---|
| 2002/0134282 A1 | 9/2002 | Ostertag et al. | 106/459 |
| 2002/0169244 A1* | 11/2002 | Ostertag et al. | 524/440 |
| 2004/0024087 A1 | 2/2004 | Bruchmann et al. | |
| 2004/0097684 A1 | 5/2004 | Bruchmann et al. | |
| 2006/0088484 A1 | 4/2006 | Thevenet | |
| 2006/0156949 A1* | 7/2006 | Pfaff et al. | 106/31.9 |
| 2006/0225533 A1 | 10/2006 | Minami | 75/338 |
| 2007/0022901 A1 | 2/2007 | Kurze et al. | |
| 2007/0199478 A1 | 8/2007 | Schlegl et al. | 106/404 |
| 2008/0190769 A1 | 8/2008 | Schuster et al. | |
| 2008/0318012 A1* | 12/2008 | Domnick et al. | 428/216 |
| 2009/0013906 A1 | 1/2009 | Fischer et al. | 106/482 |
| 2009/0214833 A1 | 8/2009 | Oyanagi et al. | 428/195.1 |
| 2010/0043963 A1 | 2/2010 | Trummer et al. | |
| 2011/0139034 A1 | 6/2011 | Wczasek et al. | 106/31.69 |

FOREIGN PATENT DOCUMENTS

| | | |
|---|---|---|
| DE | 10114445 A1 | 9/2002 |
| DE | 10114446 A1 | 9/2002 |
| DE | 202004005921 U1 | 6/2004 |
| DE | 10315775 A1 | 10/2004 |
| DE | 102005020763 A1 | 11/2006 |
| DE | 102007007908 A1 | 8/2007 |
| DE | 102006062270 A1 | 6/2008 |
| EP | 1621586 A1 | 2/2006 |
| JP | 58-109562 | 6/1983 |
| JP | 61-228073 | 10/1986 |
| JP | 10-110113 | 4/1998 |
| JP | A-2002-363440 | 12/2002 |
| JP | 2003-012963 | 1/2003 |
| JP | 2003-082258 | 3/2003 |
| JP | 2006-522192 | 9/2006 |
| JP | 2007-046034 | 2/2007 |
| JP | 2010-024479 | 2/2010 |
| WO | WO 02/36695 | 5/2002 |
| WO | WO 02/63397 | 5/2002 |
| WO | WO 2007/045452 | 4/2007 |
| WO | WO 2007/093401 | 8/2007 |
| WO | WO 2009/149834 | 12/2009 |

OTHER PUBLICATIONS

Hollemann-Wiberg, "Lehrbuch der Anorganischen Chemie," Walter de Gruyter & Co Verlag Berlin, 91-100th edition (1985) p. 1127, section 1.1.2.
International Search Report dated Sep. 3, 2009, issued in corresponding international application No. PCT/EP2009/003727.
European Search Report dated Nov. 5, 2008, issued in corresponding European priority application No. 08009556.5.
J. Seubert, A. Fetz, "PVD Aluminium Pigments: Superior brilliance for coatings and graphic arts." Coatings Journal, Surface Coatings International Part A Issue 2001/06, pp. 240-245.
Japanese Office Action dated Jun. 18, 2013 (with English translation) issued in Japanese Patent Application No. 2011-510884 which corresponds to U.S. Appl. No. 12/990,256.
English translation of Title and Claim 1 for JP 58-109562.
Internet Home Page of Merck, "Xirona® Le Rouge—An Inorganic Red Pigment With Outstanding Power and Chroma," EMD Chemicals Performance Materials—Xirona® Le Rouge, http://www.emd-performance-materials.com/en/cosmetics/xirona/xirona_le_rouge/xirona_le_rouge.html[Dec. 19, 2013 3:19:32 PM].
Peter Wißling, "Metallic Effect Pigments—Fundamentals and Applications," Hannover: Vincentz Network GmbH & Co. KG, Hannover/Germany, European Coatings Literature, 2 pages (2006).
Ralf Glausch, et al., "Special Effects Pigments," Roman Maisch . . . -Hannover: Vincentz, European Coatings Literature, 3 pages (1998).

* cited by examiner

*Primary Examiner* — Pegah Parvini
(74) *Attorney, Agent, or Firm* — Ostrolenk Faber LLP (57) ABSTRACT

Iron effect pigments having a thickness distribution, determined via thickness counting by scanning electron microscopy (SEM), as a cumulative undersize distribution with:

a) an $h_{50}$ value from 10 to 55 nm; and b) an $h_{90}$ value from 20 to 80 nm, and also a method for producing the pigments, and the use of the iron effect pigments. The disclosure further relates to a printing ink comprising the iron effect pigments of the invention.

20 Claims, 1 Drawing Sheet

THIN, PLATELET-SHAPED IRON PIGMENTS, PRODUCTION THEREOF AND USE THEREOF

CROSS REFERENCE TO RELATED APPLICATIONS

The present application is a 35 U.S.C. §371 National Phase conversion of PCT/EP2009/003727, filed May 26, 2009, which claims benefit of European Application No. 08009556.5, filed May 26, 2008, the disclosure of which is incorporated herein by reference. The PCT International Application was published in the German language.

TECHNICAL FIELD

The invention relates to thin, platelet-shaped iron pigments, their production and use.

BACKGROUND

Effect pigment platelets of iron, also referred to as iron flakes or iron effect pigments, are used in particular on account of their magnetic orientability in the decorative field. By orienting the iron pigments along the magnetic field lines in the application medium while it is still liquid, it is possible to generate very attractive 3D effects or holograms.

The production of platelet-shaped iron pigments by dry or wet grinding of reductively treated carbonyl iron powder in the presence of grinding assistants, with a size which is desired in particular for automotive finishing and with a "silver dollar" shape known from aluminum pigments, is described comprehensively in DE 101 14 446 A1, for example.

In this known grinding operation, the coarse powder particles are mechanically deformed into iron platelets, and are not comminuted. In order to prevent cold welding of the iron particles in the course of grinding, a lubricant is added, a fatty acid such as stearic or oleic acid, for example. These pigment platelets of iron, provided with an inhibitor coating, composed of a passivating anticorrosion coating and an inhibitor layer, have an average particle size of 5 to 100 μm and an average particle thickness of 500 to 30 nm. Although this specification describes the production of optically appealing effect pigments with high flop, such products have not been able to establish themselves on the market, owing to their optical properties. Thus, the Ferricon 200 product (Eckart) is sold only on the basis of its magnetic properties, which allow orientation of the pigment platelets in a magnetic field and, resulting therefrom, interesting 3D effects. As a normal effect pigment, however, acting on the basis of its plane-parallel orientation in an application medium, it has to date been unable to attract interest.

Relative to highly brilliant aluminum pigments, the hue was too matt and dark, owing to the lower reflectivity of iron.

In the printing ink sector as well, the pigment has to date been unable to find any application as a pure effect pigment. Particularly in so-called reverse-face application, it has provided no satisfaction to date. With PVD aluminum pigments, in contrast, proper mirror effects can be produced in reverse-face application.

On the other hand, there is a high demand in the market for black, lustrous metallic effect pigments. The iron effect pigments known from DE 101 14 446 A1 do not satisfy this demand, in relation to gloss and darkness or blackness.

DE 101 14 445 A1 also discloses iron effect pigments coated with metal oxides.

DE 10 2007 007908 A1 discloses dark, black metallic effect pigments. These pigments, however, are obtainable only via PVD processes, and a defined oxygen content must be established in the metallic effect pigments produced, thus making them very expensive and also costly and inconvenient to produce.

DE 103 15 775 A1 discloses aluminum pigments that are coated with fatty acid and optionally with a passivating inhibitor or anticorrosion layer, and which have an average thickness of 30 to 100 nm.

Lastly, EP 1 621 586 A1 describes a platelet-shaped aluminum pigment having a pronounced metal gloss and a fine grain distribution. This aluminum pigment has an average thickness of 0.025 to 0.08 μm and an average particle diameter ($D_{50}$) of 8 to 30 μm.

SUMMARY

It is an object of the present invention to provide iron effect pigments having improved optical properties. The pigments in particular are to exhibit better gloss and lightness flop and also a relatively dark hue through to a black metallic effect pigment. These effect pigments, moreover, are to be producible via a technically simple method.

The object is achieved through the provision of iron effect pigments which have a thickness distribution as determined via thickness counting by scanning electron microscopy (SEM) and represented as cumulative undersize distribution
a) an $h_{50}$ from a range from 10 to 55 nm
b) an $h_{90}$ from a range from 20 to 80 nm.

Preferred developments of the iron effect pigments of the invention are specified in dependent claims 2 to 8.

The object on which the invention is based is further achieved by a method for producing iron effect pigments of any of claims 1 to 8, which comprises the following step:

grinding a coarse iron powder having a particle size distribution featuring a $d_{10}<2.0$ μm, a $d_{50}<5.0$ μm, and a $d_{90}<7.0$ μm, using a milling mechanism, in the presence of solvent and lubricants and spherical grinding media.

Preferred developments of the method are specified in dependent claims 9 to 13.

The object according to the invention is further achieved through the use of the iron effect pigments of the invention as effect pigments in coatings, paints, varnishes, printing inks, powder coatings, plastics, securities printing and security printing, cosmetics, and reflector material in the production of multilayer effect pigments.

The iron effect pigments of the invention are used preferably as magnetically orientable effect pigment in coatings, paints, varnishes, printing inks, powder coatings, plastics, securities printing and security printing or cosmetic applications.

The object on which the invention is based is further coated through provision of a coated article comprising and/or having iron effect pigments of any of claims 1 to 8, preferably with the iron effect pigments of the invention or a coating material which comprises the iron effect pigments of the invention.

The object is achieved, finally, through provision of a printing ink which comprises the iron effect pigments of the invention of any of claims 1 to 8.

DETAILED DESCRIPTION

In the text below, the terms iron pigments and iron effect pigments are used interchangeably.

By iron effect pigments are meant platelet-shaped iron pigments. By virtue of the platelet shape, these iron effect pigments are capable of directed reflection of incident light, and hence of a mirrorlike effect.

These innovative pigments have properties which have never before been achieved in toto for iron effect pigments, particularly gloss, flop, opacity, and a relatively dark metal tone.

It has surprisingly emerged that iron effect pigments which have a narrow thickness distribution, as specified in claim 1, exhibit unexpected gloss properties in conjunction with darkness or blackness.

In contrast to the iron effect pigments known from DE 101 14 446 A1, the iron effect pigments of the invention are not matt, but are lustrous. Additionally, the iron effect pigments of the invention, as compared with the iron effect pigments according to the teaching of DE 101 14 446 A1, are darker or blacker.

Although so far there has been no scientific explanation for this phenomenon, it is thought that these particular optical effects are associated with the narrow thickness distribution indicated in claim 1, and also with the absolute thicknesses indicated.

The iron effect pigments of the invention are stacked more uniformly in the application medium than are conventional iron pigments. With the conventional iron pigments, disuniformities in the stacking of the pigments may easily occur. For instance, very thick pigments in particular may act as "spacers", and this impacts the orientation of the surrounding or adjacent iron effect pigments.

This has an adverse influence on gloss and flop and, in certain circumstances, on the opacity.

The iron effect pigments of the invention have an iron content of preferably at least 80%-90% by weight, more preferably of at least 81%-87% by weight, and very preferably of at least 82%-86% by weight. The percent by weight figures given above relate in each case to the total weight of the iron effect pigments.

It is preferred, furthermore, for the oxygen content of the platelet-shaped iron core of the iron effect pigments of the invention to be 10 to 20 atom %, and more preferably 13 to 19 atom %, and very preferably 14 to 18 atom %.

The relatively high oxygen content can be explained by the extreme thinness of the pigments and hence their high specific surface areas. The iron oxide layer that forms naturally at the surface contributes to the relatively high oxygen contents.

The iron and oxygen content of the iron effect pigments of the invention is preferably at least 96% by weight, more preferably at least 97% by weight, and very preferably at least 98% by weight, based on the total iron effect pigment. In addition, of course, naturally occurring impurities such as silicon, for example, may be present in small amounts.

Determining the exact average thickness of platelet-shaped metal pigments is difficult. In practice, pigment thickness is determined by way of the degree of water coverage (spreading in accordance with DIN 55923) and/or by scanning electron microscopy (SEM). The degree of water coverage allows calculation only of an average thickness h for the pigments, but not of the thickness distribution. In order to exclude irreversible agglomeration, the average thickness of the iron effect pigments of the invention was determined for the purposes of this invention by means of scanning electron microscopy (SEM). With this method, a sufficient quantity of particles is measured that a representative statistical evaluation can be made. Typically, around 100 particles are measured. The thickness distribution is usefully represented in the form of a cumulative undersize curve. An appropriate "average value" is the $h_{50}$ value of the cumulative thickness undersize curve. A measure of the coarse fraction is the $h_{90}$ value. The $h_{90}$ expresses the possession, by 90% of all of the pigment particles, of a thickness below this figure. Correspondingly, for example, an $h_{99}$ value expresses the possession by 99% of all of the pigment particles of a thickness below this figure. Similarly, the $h_{10}$ is a measure of the fine fraction of the thickness distribution, and expresses the possession by 10% of all of the pigment particles of a thickness below this figure.

These figures may be determined arithmetically from a list of the individual values measured, by means, for example, of the "quantile" function in an Excel representation. Determining the thicknesses of the individual pigments by SEM takes place in accordance with the method described in DE 103 15 775 A1.

The iron effect pigments of the invention have a thickness distribution, determined via thickness counting by scanning electron microscopy (SEM), which, represented as the cumulative undersize distribution, has an $h_{50}$ from a range from 10 to 55 nm, preferably from 12 to 50 nm, more preferably from 14 to 45 nm, and very preferably from 15 to below 40 nm.

Below an average thickness $h_{50}$ of 10 nm, the iron effect pigments become too dark, which is attributable to the loss of the metallic reflection capacity with retention of the high absorption properties of the iron. Moreover, the iron effect pigments become too mechanically unstable to be still able to be appropriately processed. Moreover, there is a decrease in the opacity. Above an average thickness $h_{50}$ of 55 nm, the advantageous optical properties, i.e., gloss in conjunction with darkness or blackness, are no longer present.

Furthermore, the pigments of the invention have an $h_{90}$ from a range from 20 to 80 nm, preferably from 22 to 70 nm, and more preferably from 25 to 60 nm.

Above an $h_{90}$ of 80 nm, the advantageous properties of the iron effect pigments would no longer be observable. In particular it would no longer be possible to see the very dark hue at relatively acute viewing angles.

Iron effect pigments having an $h_{90}$ of below 20 nm have not been economically produced to date by grinding. Metallic effect pigments having such narrow thickness distributions have hitherto been accessible only via PVD techniques. Iron, in turn, is difficult to vaporize, on account of its high melting point. For this reason, there have to date been no commercially available iron effect pigments produced by means of PVD techniques.

The advantageous optical properties of the iron pigments of the invention are evidently based on a low thickness of all of the iron effect pigments in the pigment thickness distribution. In particular there must largely be no thicker pigments above about 100 nm. Preferably, therefore, the $h_{98}$ is less than 100 nm, more preferably less than 90 nm, very preferably less than 80 nm, and especially preferably less than 70 nm.

In a further preferred embodiment, the iron effect pigments of the invention have an average thickness $h_{50}$ from a range from 15 to 45 nm and an $h_{90}$ from a range from 25 to 60 nm. In a further, particularly preferred embodiment of the iron effect pigments of the invention, they have an average thickness $h_{50}$ ($h_{50}$ value) from a range from 20 to 40 nm and an $h_{90}$ from a range from 30 to 50 nm.

An effect of the low thicknesses of the iron effect pigments of the invention is, advantageously, very good stacking of the pigments in the application medium—a paint or a printing ink, for example. The pigments of the invention can be used to produce, for example, opaque coatings having very low film thicknesses—a film thickness of less than 10 μm, for example—with high gloss and dark flop.

In automobile finishing in particular there is a need, particularly with regard to cost saving grounds, for low film thicknesses. Basecoat film thicknesses have to date been situated in a region of about 15 μm. Lower film thicknesses as well are already standard now on highly curved elements. On costs grounds, film thicknesses of less than 10 μm would be particularly advantageous.

In the case of printing inks, the film thicknesses are generally very much lower than for paints. This is particularly so for gravure inks. Gravure inks pigmented with conventional iron effect pigments have a solids content of approximately 40% by weight. Print films, in contrast, have a wet film coating of approximately 3 to 6 μm and a dry film thickness of only about 1.5 to 3 μm. On account of the very low thickness and the narrow thickness distribution, therefore, the iron effect pigments of the invention can be used very advantageously in printing inks and print films.

In further-preferred embodiments, the iron effect pigments of the invention have an $h_{10}$ of the thickness distribution from a range from 8 to 40 nm, more preferably from 10 to 35 nm, and very preferably from a range from 15 to 33 nm. Below an $h_{10}$ of 8 nm, the iron effect pigments are also usually too small in relation to the size distribution (fine fraction), resulting in a strong scattered-light fraction and hence in impaired optical properties. Above an $h_{10}$ of 40 nm, in contrast, the pigments are too thick, since then of course the $h_{50}$ and $h_{90}$ are too large as well, and the combination of gloss and darkness or blackness in the iron effect pigments is no longer obtained.

The iron effect pigments of the invention are very thin pigments having a relatively narrow thickness distribution. Pigments of this kind possess a high opacity.

Opacity in pigments is typically designated as the covering of a surface area per unit weight of pigment amount. The thinner the average thickness of the iron pigments and the relative breadth of the thickness distribution thereof, the greater the surface area covered by the pigment, and hence the greater the opacity of the pigment itself.

The $d_{50}$ values of the length distribution of the pigments (average diameter of the pigment platelets) are situated preferably in a range from 5 μm to 40 μm, preferably from 6 μm to 30 μm, more preferably from 7 μm to 25 μm, and very preferably from 7.5 μm to 20 μm.

Additionally preferred are fine pigments in the size range with $d_{50}$ values of 8 to below 18 μm, more preferably 9 to 17 μm, and very preferably 10 to 16 μm. Pigments of this kind preferably have nonleafing properties, i.e., the iron effect pigments are oriented predominantly not at or near the surface of an application medium, such as an ink or paint film, for example. Consequently there is no "floating" of the iron effect pigments. They are ground using oleic acid, for example, as lubricant, and are therefore coated with this substance.

In the case of this preferred embodiment, the iron effect pigments of the invention, with a preferred size of 8 to below 18 μm, have a higher form factor, leading to a greatly improved contrast when the iron effect pigments of the invention are oriented in the application medium by an applied magnetic field.

The longitudinal extent is determined in a usual way by means of laser granulometry (instrument: Cilas 1064, Cilas, France) and evaluated as sphere equivalents.

According to further embodiments of the invention, the iron effect pigments of the invention are subsequently coated with a passivating inhibitor layer and/or with a passivating anticorrosion layer. Coatings of this kind allow reliable use of the pigments of the invention in waterborne paints and/or in outdoor applications, without the gloss and color properties of the iron effect pigments of the invention being adversely affected by oxidation.

The mechanism of action of the passivating layers is complex. In the case of inhibitors, it is mostly based on steric effects. The major part of the inhibitors therefore also has an orienting effect in the sense of leafing and nonleafing as its consequence, i.e. floating or nonfloating in the application medium.

The inhibitors are usually added at low concentrations in the order of 1% to 15% by weight, based on the weight of the iron effect pigment employed.

For inhibition it is preferred to use the following coating substances:

organically modified phosphonic acids and/or their esters of the general formula R—P(O)(OR$_1$)(OR$_2$), where: R=alkyl, aryl, alkyl-aryl, aryl-alkyl, and also alkyl ethers, especially ethoxylated alkyl ethers, and $R_1$, $R_2$=H, $C_nH_{2n+1}$, with n=1 to 12, preferably 1-6, it being possible for alkyl in each case to be branched or unbranched. $R_1$ may be the same as or different from $R_2$.

Organically modified phosphoric acids and esters of the general formula R—O—P(OR$_1$)(OR$_2$) with R=alkyl, aryl, alkyl-aryl, aryl-alkyl, and also of alkyl ethers, especially ethoxylated alkyl ethers, and $R_1$, $R_2$=H, $C_nH_{2n+1}$, with n=1 to 12, preferably 1-6, it being possible for alkyl in each case to be branched or unbranched. $R_1$ may be the same as or different from $R_2$.

Use may be made of pure phosphonic acids or esters or phosphoric acids or esters, or any desired mixtures thereof.

Where the iron particles are ground or deformed in a predominantly aqueous solvent, aforementioned inhibitors are used as grinding assistants, in order to prevent hydrogen being formed—which is hazardous from a safety standpoint—during the grinding operation, and, in addition, to prevent oxidation of the iron particles and of the resultant iron effect pigments.

The passivating inhibitor layer may additionally comprise or be composed of corrosion-inhibiting, organically functionalized silanes, aliphatic or cyclic amines, aliphatic or aromatic nitro compounds, oxygen-, sulfur and/or nitrogen containing heterocycles, such as, for example, thiourea derivatives, sulfur and/or nitrogen compounds of higher ketones, aldehydes and/or alcohols (fatty alcohols) and/or thiols, or mixtures thereof. The passivating inhibitor layer may alternatively be composed of the substances identified above. Preference is given to organic phosphonic acids and/or phosphoric esters or mixtures thereof. Where amine compounds are used, they preferably have organic radicals having more than 6 C atoms. Preference is given to using aforementioned amines together with organic phosphonic acids and/or phosphoric esters or mixtures thereof.

There are a variety of possible ways of passivating via corrosion protection barriers with chemical and physical protective effect.

Passivating anticorrosion layers which ensure particularly good protection from corrosion for the iron effect pigments, comprise or are composed of silicon oxide, preferably silicon dioxide, chromium iron oxide, which is applied preferably by chromating processes, chromium oxide, zirconium oxide, aluminum oxide, polymerized synthetic resin(s), phosphate, phosphite or borate compounds, or mixtures thereof.

Preference is given to silicon dioxide layers and chromium iron oxide layers (chromating).

The $SiO_2$ layers are produced preferably by sol-gel methods, with average layer thicknesses of 5-150 nm and preferably of 10-40 nm, in organic solvents.

The method for producing the iron pigments of the invention is set out below. It is notable for very gentle deformative grinding of very fine iron powder having a very narrow particle size distribution.

The process of producing thin, platelet-shaped iron pigments comprises the grinding of a coarse iron powder having a particle size distribution with a $d_{powder,10} \leq 2.0$ μm, a $d_{powder,50} \leq 5.0$ μm, and a $d_{powder,90} \leq 7.0$ μm, using a milling mechanism, in the presence of solvent and lubricants and spherical grinding media.

The size distribution of the coarse iron powder has a $d_{powder,10} \leq 2.0$ μm, a $d_{powder,50} \leq 5.0$ μm, and a $d_{powder,90} \leq 7.0$ μm. The size distribution preferably comprises a $d_{powder,10} \leq 1.6$ μm, a $d_{powder,50} \leq 3.3$ μm, and a $d_{powder,90} \leq 5.5$ μm.

The span of the size distribution of the coarse iron powder, calculated according to the formula $$\Delta d_{powder} = (d_{powder,90} - d_{powder,10})/d_{powder,50},$$

is preferably 0.7 to 1.6, more preferably 0.8 to 1.5, and very preferably 0.9 to 1.4.

Only with such fine and relatively narrow-range coarse iron powders is it possible to produce the iron effect pigments of the invention. As a lower limit, the size distribution has the following parameters: $d_{powder,10} \geq 0.5$ μm, $d_{powder,50} \geq 0.8$ μm, and $d_{powder,90} \geq 1.5$ μm. Particularly preferred lower limits on the coarse iron powder used are as follows: $d_{powder,10} \geq 0.7$ μm, $d_{powder,50} \geq 1.5$ μm, and $d_{powder,90} \geq 2.5$ μm. The coarse iron powder used, therefore, is predominantly not coarse iron powder in nanometric dimensions.

The use of such a fine iron powder with narrow size distribution is of essential importance for the production of the iron effect pigments of the invention. During the deformative grinding, the coarse iron powder particles are not deformed with full uniformity: this means that certain particles are more greatly deformed, while a fraction of the coarse powder particles are only deformed at a very late stage during grinding. One of the reasons for this is the fact that the deformation probability of a particle is dependent on its size. Thus particles which have already undergone preliminary deformation to form platelets possess a higher specific surface area than coarse powder which has not yet undergone deformation, and, accordingly, possess a greater probability of undergoing further deformation. The breadth of the size distribution of the coarse powder is therefore a factor not only in the size distribution of the iron platelets shaped from it, but also of the distribution of the thickness distribution. For narrow thickness distributions, therefore, it is necessary to use a coarse iron powder having correspondingly low variation in size.

The iron particles of a standard commercial iron powder are ground using conventional grinding assistants, as for example with a solvent such as white spirit and with a lubricant such as oleic acid, by means of spherical grinding media, by an extremely gentle deformative grinding procedure, to give thin iron platelets. Deformative grinding here means a gentle grinding in which the coarse powder is largely just deformed. The coarse powder and the resultant platelets, therefore, are only subjected to increasing deformation, and largely not to comminution.

The grinding media are preferably grinding balls and consist preferably of steel, glass or ceramic. With particular preference the grinding balls consist of steel. The grinding balls preferably have an average size of 0.5 to 1.5 mm and more preferably of 0.6 up to 1.0 mm.

The coarse iron powder used here is preferably carbonyl iron powder, and more preferably reductively treated carbonyl iron powder. The production and composition of this coarse powder is described comprehensively in DE 101 14 446 A1, hereby incorporated by reference.

It is additionally possible to use coarse iron powder produced by electrolytic methods or by wet precipitation methods, or by a combination of these methods. In principle it is possible to use coarse iron powders prepared, for example, in accordance with the methods set out in Hollemann, Wiberg "Lehrbuch der Anorganischen Chemie", Walter de Gruyter & Co Verlag Berlin, 91-100$^{th}$ edition (1985) p. 1.127 section 1.1.2.

A key difference relative to the method according to the teaching of DE 101 14 446 A1 is that iron carbonyl powders must have a narrow size distribution, as set out above. Accordingly, carbonyl iron powder intended for use, or any other coarse iron powder, may first need to be classified in order to set the above size distribution. The classifying of the coarse iron powder or of carbonyl iron powder can be accomplished, for example, by sieving or using a cyclone.

The grinding of the coarse powder particles of iron to form flakes (iron platelets or iron effect pigments) may take place dry or wet, i.e., in the presence of solvents such as white spirit, mineral oil, toluene, alcohols, hydrogen chlorides, water or mixtures thereof.

The coarse powder particles of iron are preferably wet ground, since wet grinding or deformation is more gentle than dry grinding or deformation, and with wet grinding the lubricant used and, where appropriate, the inhibitor substances or anticorrosion agents are distributed uniformly on the whole of the ground material. From considerations of safety as well, wet grinding or deformation is preferable. Finely divided iron powder has pyrophoric properties and is therefore better handled in a nonpulverulent way.

With wet grinding or deformation, the ground material can be classified more easily after each grinding stage.

The grinding of standard commercial iron powder takes place in conventional mills, as for example in stirred ball mills, edge runner mills, and drum ball mills, with particular advantage in rotary tube ball mills.

For grinding, iron powder of defined particle size is introduced together with solvent, white spirit for example, into a ball mill. In order to prevent cold welding of the powder particles, lubricant—for example, oleic acid, stearic acid—or else inhibitors are added, in an amount dependent on the particular free specific surface area (BET) of the rolled iron pigments. Generally speaking, 2% to 25% by weight of oleic acid and/or stearic acid, and preferably 2.5% to 22% by weight, based on the weight of the iron powder, are used.

Where carbonyl iron powder is used, it is reduced by heat treatment, in a customary way, which is described comprehensively in DE 101 14 446 A1, for example, whose content is hereby incorporated by reference.

It is also possible, however, to use a coarse iron powder which is produced in atomizers by atomization of liquid iron. The coarse powder preferably has a largely round form. Particular preference is given to coarse iron powders having a spherical to slightly ellipsoidal form.

The coarse iron powder for use in accordance with the invention is a very fine metal powder having a very narrow size distribution. The grain band of the size distribution is typically determined by laser granulometry.

Following the atomization step, the coarse powder may be brought by means of corresponding classification steps to the desired narrow size distribution. Classifying can be carried out with air classifiers, cyclones, sieves and/or other known devices.

In order to produce low oxide levels in the coarse iron powder, the atomizing step is conducted preferably under an inert gas atmosphere. Inert gases used are preferably nitrogen and/or helium.

The purity of the iron used for atomization is preferably 97.0% to more than 99.9% by weight, and more preferably 98.0% to 99.9% by weight, based on the total weight of the coarse iron powder. The coarse powder may include, in correspondingly small quantities, the typical alloying constituents (e.g., Mg, Si, Cr, Mn, etc.).

The coarse iron powder is carried out using a grinding mechanism, preferably a ball mill or a stirred ball mill, in the presence of solvent and lubricants as grinding assistants, and of spherical grinding media, preferably grinding balls.

Grinding may be carried out in one operation or else in two or more operations. For example, in the case of two grinding stages, grinding balls differing in size may be used in each case.

Because of the gentle mode of grinding, the duration of grinding is comparatively long. The grinding time is preferably over 12 to 100 h, more preferably 15 to 80 h, and very preferably 18 to 45 h. Where grinding is carried out in two or more stages, these grinding times are understood to be the total time of the grinding duration.

With grinding times of 12 h or less, the pigments may not be sufficiently deformed to acquire the small thicknesses according to the invention. If there is a desire to obtain the iron effect pigments of the invention in shorter grinding times, then the particles must be more greatly deformed, as for example by higher speeds of rotation. In that case, however, the procedure more and more becomes one of comminutive grinding, and iron pigments of low quality are obtained. Grinding times of more than 100 h, on the other hand, are uneconomic.

The long grinding times result in a large number of powder/pigment-ball impacts. As a result, the pigment is very uniformly shaped, resulting in a very smooth surface and a very narrow thickness distribution.

Preference is given to balls having a very smooth surface, a very round form, and uniform size. The temperatures during the grinding operation are typically in the range from 10° C. to 70° C. Preference is given to temperatures in a range from 25° C. to 50° C.

The grinding or deforming is carried out preferably in a solvent, preferably with a weight ratio of solvent to iron particles of 0.8 to 6 and more preferably of 1.0 to 4.0.

The weight ratio of the grinding balls to iron particles is preferably from 20 to 120, more preferably from 25 to 100.

In relation to grinding in a ball mill, the critical speed $n_{crit}$ is an important parameter, indicating the point in time at which the particles are pressed against the mill wall by the centrifugal forces, and grinding virtually no longer takes place:

$$n_{crit} = \sqrt{\frac{g}{2\pi^2} \cdot \frac{1}{D}}$$

where D is the drum diameter and g is the gravitational constant.

The rotational speeds in the ball mills are preferably 20% to 70%, more preferably 25% to 65%, of the critical speed $n_{crit}$.

Low rotational speeds favor slow deformation of the iron particles. In order to bring about slow deformation, it is preferable to use lightweight grinding balls in the method of the invention as well. Preference is given to using grinding balls having an individual weight of 0.2 to 10 mg, more preferably of 0.21 to 5 mg, and very preferably of 0.22 to 4.3 mg.

Unlike conventional grinding methods, the coarse iron powder in the method of the invention is predominantly not ground or comminuted, but instead deformed very gently over a relatively long time period.

The conditions cited above result in a very gentle grinding or deformation, in which the coarse iron powder is slowly shaped, and fractures as a result of ball impact with high kinetic energy are avoided.

A large number of compounds may be used as lubricants during the grinding operation.

These compounds include, in particular, the fatty acids that have been used for a long time, with alkyl radicals of 10 to 24 C atoms. It is preferred to use stearic acid, oleic acid or mixtures thereof. Stearic acid as a lubricant leads to leafing pigments, while oleic acid leads to nonleafing pigments. Leafing pigments are characterized in that they float in an application medium, as for example in a paint or a printing ink, i.e., they adopt an ordered position at the surface of the application media. Nonleafing pigments, in contrast, adopt an ordered position within the application medium. Additionally it is possible for long-chain amino compounds, for example, to be added to the fatty acids. The fatty acids may be animal or plant in origin. It is likewise possible to use organic phosphonic acids and/or phosphoric esters as lubricants.

The amount of the lubricant used should not be too low, since otherwise, as a consequence of the great deformation of the coarse iron powder, the very large surface areas of the plateletlike iron pigments produced are not sufficiently occupied by adsorbed lubricant. In this case, there are instances of cold welding. Preferred amounts are therefore 1.5% to 30% by weight, preferably 2% to 25% by weight, of lubricant, based on the weight of the coarse iron powder used.

The choice of the solvent is not critical per se. Typical solvents such as white spirit, solvent naphtha, etc., may be used. Also possible is the use of alcohols, such as isopropanol, ethers, ketones, esters, etc.

It is likewise possible to use water (at least predominantly) as solvent. In that case, however, the lubricants used ought to have a significantly corrosion-inhibiting effect. Preference is given here to phosphonic acids and/or phosphoric esters, which may also carry ethoxylated side chains. The addition of further corrosion inhibitors during grinding is also advantageous here.

Following the grinding or deforming of the iron particles, the iron effect pigments obtained are separated from the grinding media, preferably the grinding balls.

In a further, preferred step in the method, the iron effect pigments obtained may be subjected to size classification. This classification ought go be carried out gently, in order not to destroy the thin iron effect pigments of the invention. The classification process here may be, for example, a wet sieving, a decantation or else a separation by sedimentation (using gravity or by centrifuging). In the case of wet sieving, as a general rule, the coarse fraction is screened out. With the other techniques, the fine fraction may be separated off in particular. The suspension is subsequently separated from excess solvent (with the aid of a filter press, centrifuge or filter, for example).

In a further step, further processing to the desired supply form may then take place.

For instance, the iron effect pigments of the invention may be converted into a paste form. The solids content in this case is 30% to 65% by weight, preferably 40% to 60% by weight, and more preferably 45% to 55% by weight, based on the total weight of the paste.

Furthermore, the iron effect pigments of the invention may be converted by drying into a powder form, preferably into a nondusting powder form. The dry powder may be processed further in a suitable homogenizer to give a nondusting metal powder, by addition of very small amounts of solvent (<10%). It is also possible first to dry the filter cake and then to paste it up again with a different solvent (re-wetting).

The iron effect pigments of the invention may also, however, surprisingly, be converted, by adding a suitable dispersion of an appropriate resin to the filter cake, into granules, pellets, briquets, tablets or sausages. These supply forms possess the advantages that they are nondusting, are easy to meter, and have outstanding dispersibility.

It has been found, surprisingly, that in spite of the low thickness the iron effect pigments of the invention may be compacted without any detriment to the optical properties of the iron effect pigments when they are introduced at a later point in time into an ink or paint medium.

Pelletizing may be carried out on a pelletizing plate in a conventional way. Tabletting may take place in a tabletting apparatus. The sausages may be produced by a compression molding process from iron effect pigment paste or powder, or by extruding an iron effect pigment paste through an extruder and using a rotary knife arrangement to chop up the extruded paste strands. Granulating the iron effect pigments of the invention can be done, for example, by spray granulation.

The iron effect pigments of the invention can be provided very advantageously in granules or pellets with high pigment contents, of 90% by weight to 35% by weight, for example, preferably of 70% by weight to 40% by weight, based on the total weight of the granule or pellet.

On account of the high specific surface area of the iron effect pigments of the invention it is necessary to use relatively large amounts of dispersing resin for the pelletization—for example—of the iron effect pigments of the invention. It is preferred to use 2%-50% by weight, more preferably 5% to 30% by weight, of resin, based on the total weight of the overall formulation of the pellets.

For pelletizing, a large number of dispersing resins can be used. Examples thereof include both naturally occurring and synthetic resins. They comprise, for example, alkyd resins, carboxymethyl- and carboxyethyl-cellulose resins, cellulose acetate, cellulose acetate propionate (CAP) and cellulose acetate butyrate (CAB), coumarol-indene resins, epoxide esters, epoxide-melamine and epoxide-phenol condensates, ethyl- and methylcellulose, ethylhydroxyethylcellulose, hydroxy-ethylcellulose, hydroxypropylmethylcellulose, ketone resins and maleic acid resins, rosins, melamine resins, nitrocellulose resins, phenolic and modified phenolic resins, polyacrylamide, polycarbonate, polyamide, polyester, polyether, polyurethane, and vinyl resins.

Among these polymeric resins, the following are preferred more particularly: acrylate copolymers and acrylic ester resins, polyacrylonitrile and acrylonitrile copolymer resins, copolymers of butadiene and vinylidene chloride, butadiene/styrene copolymers, methyl acrylate and methyl methacrylate copolymers; and also polybutene, polyisobutylene, polyvinyl acetate, polyvinyl alcohol, polyvinyl chloride, polyvinyl ether, polyvinylpyrrolidone, and polystyrene resins. Other copolymers include styrene/maleic anhydride resins and styrene/shellac resins, vinyl chloride/vinyl acetate resins, vinyl chloride/vinyl ether resins, and vinyl chloride/vinylidene chloride resins.

Naturally occurring resins such as gum arabic, gutta percha, casein and gelatin may also be used, furthermore.

Preference is given to aldehyde resins, such as the Laropal range from BASF AG, Ludwigshafen, Germany.

Waxes are also suitable as binder materials. These include, as examples of natural waxes, beeswax, candelilla wax, carnauba wax, montan wax, and also paraffin waxes. Synthetic waxes such as PE waxes for example, are likewise contemplated.

The aforementioned preparations can be incorporated very well, for example, into paint systems or printing inks, without instances of unwanted agglomeration of iron effect pigments of the invention.

The iron effect pigments of the invention, passivated by means of subsequent coatings, find use preferably in waterborne paints and in outdoor applications.

The platelet-shaped iron effect pigments of the invention, with unique optical qualities and pronounced color flop from dark metallic to black metallic, and with a hitherto unknown flip-flop effect, allow formulations in dark hues with a pronounced metallic optical quality.

These innovative iron effect pigments are opening up new possibilities for groundbreaking effect coating, and/or, with their performance properties, are an economically effective supplement to the conventionally traded iron effect pigments.

The excellent wetting behavior and the resultant outstanding pigment orientation displayed by the iron effect pigments of the invention result in homogeneous, highly hiding, and brilliant metal surfaces.

In the application medium, the iron effect pigments of the invention can be mixed advantageously with conventional color pigments or dyes.

The conventional color pigments typically have average particle sizes of 0.05 to 5 μm and include both organic and inorganic pigments.

Inorganic color pigments which can be used are chromatic, black, and white pigments. Typical organic pigments are chromatic and black pigments.

Examples of suitable organic pigments include the following:

| | |
|---|---|
| Monoazo pigments: | C.I. Pigment Brown 25; |
| | C.I. Pigment Orange 5, 13, 36, 38, 64, and 67; |
| | C.I. Pigment Red 1, 2, 3, 4, 5, 8, 9, 12, 17, 22, 23, 31, 48:1, 48:2, 48:3, 48:4, 49, 49:1, 51:1, 52:1, 52:2, 53, 53:1, 53:3, 57:1, 58:2, 58:4, 63, 112, 146, 148, 170, 175, 184, 185, 187, 191:1, 208, 210, 245, 247, and 251; |
| | C.I. Pigment Yellow 1, 3, 62, 65, 73, 74, 97, 120, 151, 154, 168, 181, 183, and 191; |
| | C.I. Pigment Violet 32; |
| Disazo pigments: | C.I. Pigment Orange 16, 34, 44, and 72; |
| | C.I. Pigment Yellow 12, 13, 14, 16, 17, 81, 83, 106, 113, 126, 127, 155, 174, 176, 180, and 188; |
| Disazocondensation pigments: | C.I. Pigment Yellow 93, 95, and 128; |
| | C.I. Pigment Red 144, 166, 214, 220, 221, 242, and 262; |
| | C.I. Pigment Brown 23 and 41; |
| Anthanthrone pigments: | C.I. Pigment Red 168; |
| Anthraquinone pigments: | C.I. Pigment Yellow 147, 177, and 199; |
| | C.I. Pigment Violet 31; |
| Anthrapyrimidine pigments: | C.I. Pigment Yellow 108; |

| | |
|---|---|
| Quinacridone pigments: | C.I. Pigment Orange 48 and 49; C.I. Pigment Red 122, 202, 206, and 209; C.I. Pigment Violet 19; |
| Quinophthalone pigments: | C.I. Pigment Yellow 138; |
| Diketopyrrolopyrrole pigments: | C.I. Pigment Orange 71, 73, and 81; C.I. Pigment Red 254, 255, 264, 270, and 272; |
| Dioxazine pigments: | C.I. Pigment Violet 23 and 37; C Pigment Blue 80; |
| Flavanthrone pigments: | C.I. Pigment Yellow 24; |
| Indanthrone pigments: | C.I. Pigment Blue 60 and 64; |
| Isoindoline pigments: | C.I. Pigment Orange 61 and 69; C.I. Pigment Red 260; C. Pigment Yellow 139 and 185; |
| Isoindolinone pigments: | C.I. Pigment Yellow 109, 110, and 173; |
| Isoviolanthrone pigments: | C.I. Pigment Violet 31; |
| Metal complex pigments: | C.I. Pigment Red 257; C. Pigment Yellow 117, 129, 150, 153, and 177; C.I. Pigment Green 8; |
| Perinone pigments: | C.I. Pigment Orange 43; C.I. Pigment Red 194; |
| Perylene pigments: | C.I. Pigment Black 31 and 32; C.I. Pigment Red 123, 149, 178, 179, 190, and 224; C.I. Pigment Violet 29; |
| Phthalocyanine pigments: | C.I. Pigment Blue 15, 15:1, 15:2, 15:3, 15:4, 15:6 and 16; C.I. Pigment Green 7 and 36; |
| Pyranthrone pigments: | C.I. Pigment Orange 51; C.I. Pigment Red 216; |
| Pyrazoloquinazolone pigments: | C.I. Pigment Orange 67; C.I. Pigment Red 251; |
| Thioindigo pigments: | C.I. Pigment Red 88 and 181; C.I. Pigment Violet 38; |
| Triarylcarbonium pigments: | C.I. Pigment Blue 1, 61 and 62; C. C.I. Pigment Green 1; C.I. Pigment Red 81, 81:1 and 169; C.I. Pigment Violet 1, 2, 3, and 27; C.I. Pigment Black 1 (aniline black); C.I. Pigment Yellow 101 (aldazine yellow); C.I. Pigment Brown 22. |

Examples of suitable inorganic pigments include the following:

| | |
|---|---|
| White pigments: | Titanium dioxide (C.I. Pigment White 6), zinc white, pigmentary zinc oxide; zinc sulfide, lithopones; |
| Black pigments: | Black iron oxide (C.I. Pigment Black 11), iron manganese black, spinel black (C.I. Pigment Black 27); carbon black (C.I. Pigment Black 7); |
| Chromatic pigments: | Chromium oxide, chromium oxide hydrate green; chromium green (C.I. Pigment Green 48); cobalt green (C.I. Pigment Green 50); ultramarine green; cobalt blue (C.I. Pigment Blue 28 and 36; C.I. Pigment Blue 72); ultramarine blue; manganese blue; ultramarine violet; cobalt and manganese violet; red iron oxide (C.I. Pigment Red 101); cadmium sulfoselenide (C.I. Pigment Red 108); cerium sulfide (C.I. Pigment Red 265); molybdate red (C.I. Pigment Red 104); ultramarine red; brown iron oxide (C.I. Pigment Brown 6 and 7), mixed brown, spinel and corundum phases (C.I. Pigment Brown 29, 31, 33, 34, 35, 37, 39, and 40), chromium titanium yellow (C.I. Pigment Brown 24), chromium orange; cerium sulfide (C.I. Pigment Orange 75); yellow iron oxide (C.I. Pigment Yellow 42); nickel titanium yellow (C.I. Pigment Yellow 53; C.I. Pigment Yellow 157, 158, 159, 160, 161, 162, 163, 164, and 189); chromium titanium yellow; spinel phases (C.I. Pigment Yellow 119); cadmium sulfide and cadmium zinc sulfide (C.I. Pigment Yellow 37 and 35); chromium yellow (C.I. Pigment Yellow 34); bismuth vanadate (C.I. Pigment Yellow 184). |

The iron effect pigments of the invention with the new coloristics of dark but highly lustrous iron can be employed with advantage in coatings, paints, varnishes, printing inks, powder coatings, plastics, and cosmetic formulations, and also as magnetic or magnetizable metallic effect pigments in the securities printing and security printing segments, and also as reflector material in multilayer effect pigments.

On account of their magnetic properties, the iron effect pigments of the invention can be ordered in the application medium along the magnetic field lines, using permanent magnets or electromagnets, to give unique effects with a fascinating depth effect and three-dimensionality. Hologramlike and cinematogramlike structures can be produced. Such structures are in demand in particular for security printing applications, but also for coatings such as automobile interior finishes, for example.

In mass tone or else in blends with color pigments, unique effects can be obtained in this way.

Compared with the magnetic pigments known in the prior art, the iron effect pigments of the invention have even better orientability in a magnetic field. On account of their more uniform thickness distribution, this results in an even greater contrast on the part of the pigments oriented differently in the magnetic field.

The iron effect pigments of the invention find use as effect pigment in coatings, paints, varnishes, printing inks, powder coatings, plastics, securities printing and security printing, cosmetology, and reflector material in the production of multilayer effect pigments.

The iron effect pigments of the invention find use, furthermore, as magnetically orientable effect pigment in coatings, paints, varnishes, printing inks, powder coatings, plastics, securities printing and security printing, or cosmetic applications.

In cosmetic formulations, nail varnishes in particular are preferred in this context. Deserving of mention in this context in particular are nail varnishes as in US 2006/0088484 A1, hereby incorporated by reference.

The iron effect pigments of the invention can be used with particular advantage in conventional coatings, as for example in the consumer electronics segment, the interior automobile design segment, or for furniture design. They can also be used advantageously in functional coating materials, for the reflection of thermal radiation, for example.

The iron effect pigments of the invention are notable, furthermore, for very good chemical resistance, light stability, and weathering stability. Moreover, in spite of the low pigment thicknesses, they can, surprisingly, be handled and processed like conventional metallic effect pigments.

The invention further provides a coated article which has or comprises the iron effect pigments of the invention.

In further-preferred embodiments, the iron effect pigments of the invention are used in printing inks. The ink in question may be a liquid printing ink such as a gravure, flexographic, screen or intaglio printing ink.

Additionally provided by the invention is a printing ink comprising the iron effect pigments of the invention, especially a liquid printing ink such as a gravure, flexographic or screen printing ink.

Gravure, flexographic or screen printing inks of this kind comprise solvents or solvent mixtures. One of the purposes of the latter is to dissolve the binders, but another is to set important performance properties of the printing inks, such as the viscosity or the drying rate, for example.

Solvents used for liquid printing inks such as flexographic and gravure inks comprise, in particular, low-boiling solvents. The boiling point as a general rule is not more than 140° C. Higher-boiling solvents are used only in relatively small amounts to set the drying rate. The formulation of screen printing inks is similar to that of flexographic or gravure inks, except that they are given a slightly higher viscosity, and typically comprise solvents having somewhat higher boiling points.

Examples of suitable solvents for liquid printing inks include ethanol, 1-propanol or 2-propanol, substituted alcohols such as ethoxypropanol, for example, or esters such as ethyl acetate, isopropyl acetate, n-propyl acetate or n-butyl acetate, for example. It is of course also possible to use mixtures of different solvents. For example, a mixture may be of ethanol and esters such as ethyl acetate or propyl acetate. For printing with flexographic printing plates it is generally advisable for the fraction of the esters as a proportion of the total solvent not to exceed about 20%-25% by weight. As solvents for liquid printing inks it is also possible with preference to employ water or predominantly aqueous solvent mixtures.

Depending on the nature of the printing ink, it is usual to use 10% to 60% by weight of solvent, relative to the sum of all of the constituents. In the case of the printing inks of the invention, however, a range of 60%-80% by weight of solvent is found to be particularly advantageous.

Radiation-curable printing inks generally do not comprise the aforementioned solvents, but instead comprise reactive diluents. Reactive diluents typically fulfill a dual function. On the one hand, they act to crosslink or cure the printing ink; on the other hand, however, they also serve, like conventional solvents (DE 20 2004 005 921 UI 2004.07.1 to adjust the viscosity. Examples include examples include butyl acrylate, 2-ethylhexyl acrylate, and also, in particular, polyfunctional acrylates such as 1,4-butanediol di(meth)acrylate, 1,6-hexanediol di(meth)acrylate or trimethylolpropane tri(meth)acrylate.

As binders for the metallic printing inks of the invention it is possible in principle to use the binders that are customary for liquid printing inks. Depending on the desired end application and on the desired properties, the skilled worker makes an appropriate selection. Examples of suitable binders include polyesters, polyamides, PVC copolymers, aliphatic and aromatic ketone resins, melamine-urea resins, melamine-formaldehyde resins, maleates, rosin derivatives, casein and casein derivatives, ethyl-cellulose, nitrocellulose or aromatic and/or aliphatic polyurethanes. Use may also be made of polymers or copolymers of vinyl acetate, vinyl alcohol, acrylates, methacrylates, vinylpyrrolidone or vinyl acetals. Of particular advantage may be the use of hyperbranched polymers containing functional groups, examples being hyperbranched polyurethanes, polyureas or polyester-amides, as disclosed by WO 02/36695 and WO 02/36697. It is of course also possible to use mixtures of different polymeric binders, subject to the proviso that the binders selected do not exhibit unwanted properties when in combination with one another. The amount of all the binders is typically 5%-40% by weight, relative to the sum of all of the constituents of the printing ink.

Particularly preferred binders include, for example, nitrocellulose, ethylcellulose, hydroxyethylcellulose, acrylates, polyvinyl butyrals, and also aliphatic and aromatic polyurethanes and polyureas, especially hyperbranched polyurethanes and polyureas, and mixtures thereof.

Binders contemplated for water-reducible metallic printing inks include, in particular, copolymers based on (meth) acrylic acid and/or esters thereof with styrene. Binders of this kind are available commercially as solutions or dispersions for use in printing inks, under the name Zinpol® (Worlee), for example. Further examples include aromatic and aliphatic aqueous polyurethanes, polyesters, and aqueous polyamides.

Binders preferred for pastelike printing inks include, for example, rosins or modified rosins. Examples of modified rosins include rosins esterified partly or wholly with polyols such as glycerol or penta-erythritol, for example.

Radiation-curable printing inks comprise binders which comprise crosslinkable groups, such as olefinic groups, vinyl ether groups or epoxide groups, for example. Here, the sum of the binders (including reactive diluents) is generally in a range of 30%-90% by weight of all the constituents of the printing ink.

The iron effect pigment printing inks of the invention may further comprise one or more auxiliaries or additives. Examples of additives and auxiliaries are fillers such as calcium carbonate, aluminum oxide hydrate or aluminum silicate or magnesium silicate. Waxes increase the abrasion resistance and serve to increase the lubricity. Examples are, in particular, polyethylene waxes, oxidized polyethylene waxes, petroleum waxes or ceresin waxes. Fatty acid amides may be used to increase the surface smoothness. Plasticizers serve to increase the elasticity of the dried film. For radiation-curable printing inks, furthermore, at least one photoinitiator or photoinitiator system is used as an additive. Dispersing assistants may be used in order to disperse the effect pigments. Fatty acids may be used to bring about floating of the effect pigments in the printed layer, so that the pigments are accumulated in/at the upper boundary surface of the printed layer. Advantageously improved metallic effects may be obtained by this means. Moreover, antisettling agents may be added as well. Such additions prevent the sedimentation of the effect pigments. Examples include silica, cellulose derivatives, or else waxes.

In order to formulate the particularly preferred low-viscosity flexographic, gravure or screen printing inks, the addition of antisettling agents is usually advisable, although not always absolutely necessary. The total amount of all additives and auxiliaries ought typically not to exceed 20% by weight, relative to the sum of all the constituents of the printing ink, and is preferably 0.1%-10% by weight.

The metallic printing inks of the invention can be produced in a way which is known in principle, by intensively mixing or dispersing the constituents in customary apparatus such as dissolvers or stirring mechanisms, for example. When using dissolvers, the skilled worker will ensure that the energy input is not too high, so as to prevent damage to the metallic effect pigments of the invention. Conversely, the energy input must of course be high enough to allow proper dispersing of the pigments. If typical color pigments are used alongside the metallic effect pigments of the invention, it may be advisable to predisperse these color pigments in a portion or in the entirety of the solvent, binder, and, where appropriate, auxiliaries of the metallic printing ink, and not to add the iron effect pigments of the invention until later. In this way, the additional pigments are dispersed to particularly good effect, without damage to the iron effect pigments from excessive dispersing. Instead of the pigments it is also possible to add predispersed pigment concentrates. Especially elegant in this context may also be the use of a commercial printing ink in small amounts, subject to the proviso that the added printing ink is compatible with the formula of the metallic printing ink and does not impair its properties.

EXAMPLES

The examples set out below illustrate the invention, but without restricting it.

Example 1

A mixture of 30 g of reduced "carbonyl iron powder SM" from BASF AG Ludwigshafen (average particle size $d_{powder,50}$=2.7 µm, $d_{powder,10}$ 1.3 µm, $d_{powder,90}$ 4.5 µm, iron content 99.8%) and 150 g of white spirit, and also 0.9 g of oleic acid, were placed into a pot mill (length: 32 cm, width: 19 cm), and the mill was closed. Grinding was then carried out for 5 h with 2 kg of steel balls (diameter: 1.5 mm) at 45 rpm. The ground product discharged from the mill was washed with white spirit and separated from the grinding balls by means of sieving (40 µm). The material that passed through the sieve was largely freed from white spirit by means of a suction filter. Of the filter cake obtained (solids content 70%), 40 g of pigment paste, together with 150 g of white spirit and also 0.9 g of oleic acid, were introduced into a pot mill (length: 32 cm, width: 19 cm). Subsequently, in a second grinding stage, grinding took place for 15 h with 3 kg of steel balls (diameter: 0.8 mm) at 38 rpm. The ground product discharged from the mill was washed with white spirit and separated from the grinding balls by means of sieving (25 µm). The sieved material was largely freed from white spirit by means of a suction filter, and then pasted up with white spirit in a laboratory mixer (approximately 65% solids fraction).

Example 2

A mixture of 60 g of reduced "carbonyl iron powder SM" (see example 1) from BASF AG Ludwigshafen and 90 g of white spirit, and also 6.0 g of oleic acid, were placed into a pot mill (length: 32 cm, width: 19 cm), and the mill was closed. Subsequently, grinding took place for 24 h with 2 kg of steel balls (diameter: 0.8 mm) at 45 rpm. The ground product discharged from the mill was washed with white spirit and separated from the grinding balls by means of sieving (25 µm). The sieved material was largely freed from white spirit by means of a suction filter, and then pasted up with white spirit in a laboratory mixer (approximately 65% solids fraction).

Example 3

A mixture of 30 g of reduced "carbonyl iron powder SU" from BASF AG Ludwigshafen (average particle size $d_{powder,50}$=1.9 µm, $d_{powder,10}$ 0.9 µm, $d_{powder,90}$ 3.3 µm, iron content 99.8%) and 60 g of white spirit, and also 6.0 g of oleic acid, were placed into a pot mill (length: 32 cm, width: 19 cm), and the mill was closed. Subsequently, grinding took place for 24 h with 2 kg of steel balls (diameter: 0.8 mm) at 45 rpm. The ground product discharged from the mill was washed with white spirit and separated from the grinding balls by means of sieving (25 µm). The sieved material was largely freed from white spirit by means of a suction filter, and then pasted up with white spirit in a laboratory mixer (approximately 65% solids fraction).

Example 4

A mixture of 100 g of reduced coarse iron powder MV 144 (NMD New Materials Development, St. Panthaleon, Austria) (average particle size $d_{powder,50}$=2.0 µm, $d_{powder,10}$ 0.5 µm, $d_{powder,90}$ 3.0 µm, iron content 98.5%) and 380 g of white spirit, and also 4 g of oleic acid, were placed into a pot mill (length: 32 cm, width: 19 cm), and the mill was closed. Subsequently, grinding took place for 32 h with 4 kg of steel balls (diameter: 1.5 mm) at 43 rpm. The ground product discharged from the mill was washed with white spirit and separated from the grinding balls by means of sieving (25 µm). The sieved material was largely freed from white spirit by means of a suction filter, and then pasted up with white spirit in a laboratory mixer (approximately 65% solids fraction).

Comparative Example 5

Commercially available Ferricon 200 (Eckart GmbH) Produced in Accordance with DE 101 14 446 A1.

The effect pigments obtained display a pronounced metallic luster and the magnetic permeability of soft iron powder.

From laser beam diffraction measurements (Cilas measurements; instrument: Cilas 1064), the size distribution was ascertained.

The samples of inventive examples 1-4 and of comparative example 5 were characterized by means of a field-ion scanning electron microscope for closer determination of the particle thicknesses.

For the determination of the thickness distribution by means of SEM, the samples were prepared as follows:

The iron effect pigments of the invention and the conventional iron effect pigments obtained from standard wet grinding, in each case present in paste or filter cake form, were in each case first washed with acetone and then dried.

A resin customary in electron microscopy, such as TEMP-FIX (Gerhard Neubauer Chemikalien, D-48031 Munster, Germany), for example, was applied to a sample plate and heated on a hotplate until it softened. Subsequently the sample plate was removed from the hotplate and the iron powder in question was scattered onto the softened resin. As a result of cooling, the resin resolidified and the scattered-on iron pigments were prepared fixed on the sample plate and standing almost vertically, owing to the interaction between adhesion and gravity. As a result, the pigments could be measured effectively from the side in the electron microscope. For the measurement of the thickness, the azimuthal angle α of the pigment relative to a plane normal to the surface was estimated, and was taken into account for the thickness evaluation, in accordance with the formula $$h_{\mathit{eff}} = h_{\mathit{meas}}/\cos \alpha.$$

The cumulative distribution curve was drawn up from the $h_{\mathit{eff}}$ values on the basis of the relative frequencies. 100 particles in each case were counted.

Figure 1:
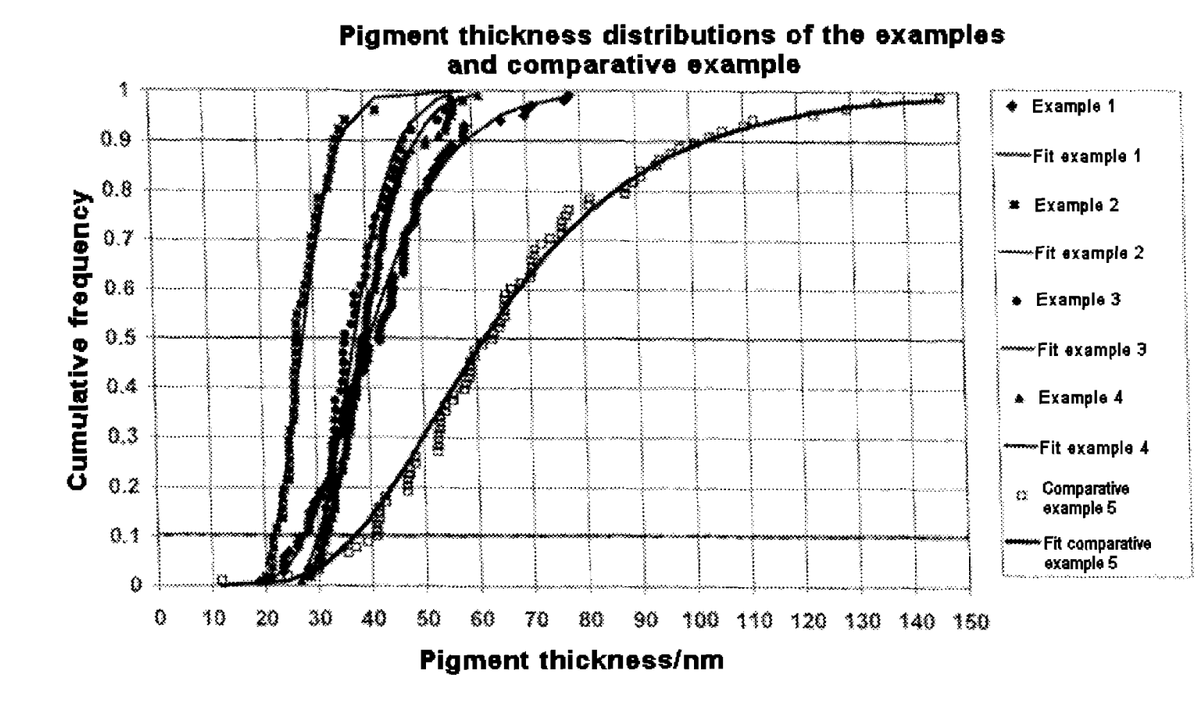

The cumulative undersize distributions of the thickness distribution for the inventive examples and for comparative example 5 are shown in FIG. 1. Statistical analyses showed that the cumulative undersize curve, starting from 75 to 100 particles, for the pigments of the invention and for conventional pigments from wet grinding, was largely constant. The much smaller particle thicknesses in the overall particle distributions of the inventive examples are clearly apparent, in comparison to Ferricon 200. The measurement values were fitted in each case using a log-normal function.

Tab. 1 below shows the physical characteristics of the iron effect pigments of the invention in comparison to commercially traded iron effect pigments "Ferricon 200" from Eckart, on the basis of the $d_{10}$, $d_{50}$, and $d_{90}$ values in the size distribution (Cilas) and the parameters $h_{10}$, $h_{50}$, and $h_{90}$, and the span values, calculated therefrom, of the thickness measurement from SEM investigations. The $h_{10}$, $h_{50}$, and $h_{90}$ values were calculated from the original data (quantile function in an Excel program).

The longitudinal extent d of the iron effect pigments was determined using a laser granulometer (Cilas 1064, Cilas, France) and, as a measure of the average longitudinal extent, the $d_{50}$ value of the cumulative undersize distribution, in µm, was selected. Additionally, the specific surface area was determined by means of the BET method.

opacity is shown on the basis of the difference in lightness at an incident angle of 45° and a viewing angle of 110°, from applicator drawdowns on contrast card in Cellit varnish.

TABLE 2

Results for the opacity (applicator drawdowns)

| Applicator drawdown on contrast card in Cellit varnish 50 µm applicator | Example 1 | Example 2 | Example 3 | Example 4 | Conventional "Ferricon 200" (comparative example 5) |
|---|---|---|---|---|---|
| Colorimetry ΔL* 110° with 12.5% pigment | 0.1 | 0.1 | 0.0 | 0.1 | 0.8 |
| Colorimetry ΔL* 110° with 10.0% pigment | 0.2 | 0.1 | 0.1 | 0.0 | 1.2 |
| Colorimetry ΔL* 110° with 8.3% pigment | 0.1 | 0.1 | 0.0 | 0.3 | 3.8 |
| Colorimetry ΔL* 110° with 6.7% pigment | 0.1 | 0.4 | 0.1 | 0.1 | 6.7 |
| Colorimetry ΔL* 110° with 5.8% pigment | 0.7 | 0.7 | 0.0 | 0.9 | 8.4 |
| Colorimetry ΔL* 110° with 5.0% pigment | 1.5 | 2.4 | 0.1 | 0.5 | 15.2 |

TABLE 1

Physical characterization of the iron effect pigments

| | Sizes | | | Thicknesses | | | Span Δh | |
|---|---|---|---|---|---|---|---|---|
| Example | $d_{10}$/µm | $d_{50}$/µm | $d_{90}$/µm | $h_{10}$/nm | $h_{50}$/nm | $h_{90}$/nm | thickness distribution | BET/m²/g |
| Example 1 | 8.1 | 15.0 | 25.3 | 28 | 42 | 57 | 69% | 8.4 |
| Example 2 | 8.0 | 14.0 | 21.0 | 22 | 31 | 53 | 100% | 8.1 |
| Example 3 | 6.5 | 11.0 | 16.0 | 31 | 36 | 47 | 44% | 12.6 |
| Example 4 | 5.6 | 11.0 | 16.8 | 32 | 39 | 52 | 51% | 9.2 |
| Comparative example 5 | 10.0 | 18.0 | 28.0 | 41 | 63 | 99 | 92% | 4.4 |

The figures in table 1 demonstrate that the iron effect pigments of the invention in each case have a lower average $h_{50}$ of the thickness distribution and in particular a lower $h_{90}$ than the commercially available product of comparative example 5 (Ferricon 200).

Tab. 2 below shows the opacity of the platelet-shaped iron effect pigments of the invention in comparison to commercially traded iron pigments "Ferricon 200" from Eckart. The The percentage figures in the table are in % by weight, based in each case on the total weight of the varnish.

The figures in the table demonstrate the substantially higher opacity of the iron effect pigments of the invention as compared with the commercially traded iron pigments "Ferricon 200" from Eckart in the application medium. The improved opacity is attributable primarily to the lower thickness of the pigments.

Examples 6-9

Gravure Printing Inks

The inventive pigments of examples 1 to 4 were each incorporated into a gravure printing ink. The gravure printing ink possessed a commercially available polyvinyl butyral binder and contained an ethyl acetate/methoxypropanol mixture as solvent.

The viscosity was adjusted to 20 s from the DIN 4 cup. The pigmentation level was approximately 16%-17% by weight of iron effect pigment, based on the total formulation.

Comparative Example 10

A gravure printing formulation corresponding to examples 6-9 with comparative example 5 (Ferricon 200).

For further characterization, so-called reverse-face applications (mirror applications) were carried out with the gravure printing inks of examples 6-10. These reverse-face applications were produced by printing a Melinex 400 film (PET film, 50 µm) with a gravure printing ink.

The gravure printing ink was applied using an applicator having a groove depth of 24 µm.

The prints were characterized with regard to their gloss from the reverse face, i.e., from the film side. On this side, the desired metal mirror effect was developed.

The reverse-face applications were characterized optically by a gloss measurement at 20° in accordance with DIN 67 530 (instrument: micro-TRI-gloss from Byk-Gardner, D-82538 Geretsried, Germany). Calibration took place here by means of dark calibration and also by means of a black mirror glass plate, with values of 92 for 20°.

Colorimetric data of mirror applications pigmented with iron effect pigments in accordance with the inventive examples and with comparative example 5, respectively, are recorded in Tab. 3 below.

Furthermore, lightness measurements (CIE Lab 1973) were carried out in accordance with manufacturer data, and the DuPont flop index was calculated:

$$\text{flop index} = 2.68 \times (L^*_{15°} - L^*_{110°})^{1.11} / L^{*0.86}_{45°}$$

The lightness measurements were carried out using an instrument from X-Rite (light source: D65, 10° standard observer)

TABLE 3

Optical properties of the reverse-face applications

| Sample | Gloss 20° | $L^*_{15°}$ | $L^*_{45°}$ | $L^*_{110°}$ | Flop index (DuPont) | Visual impression |
|---|---|---|---|---|---|---|
| Example 6 (corresponding to 1) | 220 | 92.8 | 26.1 | 4.4 | 23.5 | Lustrous, dark flop |
| Example 7 (corresponding to 2) | 285 | 88.8 | 22.9 | 3.7 | 25.2 | Highly lustrous, dark flop |
| Example 8 (corresponding to 3) | 290 | 78.7 | 22 | 4.4 | 22.4 | Very pronounced dark luster |
| Example 9 (corresponding to 4) | 225 | 91 | 26.9 | 5.2 | 22.1 | Lustrous, dark flop |
| Comparative example 10 (corresponding to 5) | 201 | 102.6 | 30.6 | 8.9 | 21.8 | Low luster, white flop |

The iron effect pigments of the inventive examples consistently have a higher luster than Ferricon 200. The flop index is likewise higher. It is striking, however, that the lightness value $L^*_{110°}$, for a viewing angle of 110°, is extremely low, and takes on values below just 6. Surfaces of this kind are perceived subjectively as being virtually black. The iron effect pigments of the inventive examples therefore have a strongly metallic luster and at the same time a very high lightness flop. At steep incident angles and/or viewing angles, the applications appear dark to black. This is perceived subjectively as a highly attractive "dark flop".

All in all, the iron effect pigments of the invention are new effect pigments with hitherto unknown, very attractive coloristic properties.

The only pigments having similar properties are known from DE 10 2007 007908 A1. Those pigments, however, are accessible exclusively through the very much more expensive PVD process.

The new, unique optical properties of the iron pigments of the invention are attributable to their low thickness. Critical in this context is not only the average value of the thickness ($h_{50}$), but also, in particular, the fact that throughout the thickness distribution there are no pigments present that are too thick. This can be expressed through the $h_{90}$ of the thickness distribution.

In this case, the pigments evidently tend to associate spontaneously in the application medium to form a coherent metallic pigment film. This behavior is known, for aluminum pigments, from the PVD pigments, and is described in references including J. Seubert and A. Fetz, "PVD Aluminium Pigments: Superior Brilliance for Coatings and Graphic Arts", Coatings Journal, Vol. 84, A6 225-264, July 2001, pages 240-245.

Thicker pigments disrupt this order and, on account of their bulkiness, may disrupt the orientation of other pigments. This then correlates with corresponding losses of luster and with a loss of brilliance.

Examples relating to the passivation of the inventive iron pigments:

Examples 11-14

SiO$_2$-Coated Iron 55.1 g of a paste with iron pigments according to each of examples 1 to 4 (metallic pigment fraction: 27.6 g) were dispersed in 375 ml of isopropanol and brought to boiling temperature. 13.0 g of tetraethoxysilane were added. Subsequently, over a period of 3 h, a solution of 5.4 g of 25% strength NH$_3$ in 9.0 g of water was metered in. After a further 3 h, cooling took place to room temperature and the suspension was filtered off on a Buchner funnel. The product was then dried overnight in a vacuum drying cabinet at 100° C.

In common gassing tests, the product exhibits excellent gassing stability and is therefore highly suitable for aqueous coating systems.

Examples 15-18

Chromated Iron 18 g of a chromic acid solution were prepared by dissolving 4.5 g of $CrO_3$ in 13.5 g of fully demineralized water.

In a 1 L reactor, 220 g of fully demineralized water were heated to 90° C. With vigorous stirring (stirring assembly: "cake slice" type), first 21 g of butylglycol and then 125 g of each of the iron pigments described in examples 1 to 4, in the form of a white spirit paste with a solids fraction of 70%, were added. A few minutes later, the chromic acid solution was added, at a reaction temperature of 80° C. The mixture is left to react for a further 50 minutes with vigorous stirring. It is then cooled for 30 minutes and, in a glass beaker, the reaction mixture is decanted a number of times with 250 ml each time of a 5% strength fully demineralized $H_2O$/butylglycol solution, until there is no longer any yellow coloration in the supernatant solution. The product is subsequently filtered off on a suction filter and washed with copious amounts of water.

In common gassing tests, the product exhibits excellent gassing stability and is therefore highly suitable for aqueous coating systems.

What is claimed is:

1. Iron effect pigments wherein the iron effect pigments have a thickness distribution as determined via thickness counting by scanning electron microscopy (SEM) and represented as cumulative undersize distribution, with
    a) an $h_{50}$ having a range from 10 to 55 nm; and
    b) an $h_{90}$ having a range from 20 to 80 nm, wherein the iron effect pigments are platelet-shaped iron pigments having a platelet-shaped iron core.

2. The iron effect pigments of claim 1, wherein the iron effect pigments have an $h_{50}$ with a range from 12 to 50 nm.

3. The iron effect pigments of claim 1, wherein the iron effect pigments have an $h_{90}$ with a range from 25 to 70 nm.

4. The iron effect pigments of claim 1, wherein the iron effect pigments have an $h_{98}$ of less than 100 nm.

5. The iron effect pigments of claim 1, wherein the iron effect pigments have an $h_{10}$ with a range from 8 to 40 nm.

6. The iron effect pigments of claim 1, wherein the iron effect pigments have an average size $d_{50}$ in a range from 5 to 40 μm.

7. The iron effect pigments of claim 1, wherein the iron effect pigments are coated with at least one of a passivating inhibitor layer and a anticorrosion layer.

8. The iron effect pigments of claim 1, wherein the iron effect pigments are present as powder.

9. A method for producing the iron effect pigments of claim 1, comprising:
    grinding a coarse iron powder having a particle size distribution featuring a $d_{powder,10} \leq 2.0$ μm, a $d_{powder,50} \leq 5.0$ μm, and $a_{powder,90} \leq 7.0$ μm, using a milling mechanism, in the presence of solvent and lubricants and spherical grinding media.

10. The method of claim 9, wherein the coarse iron powder has a particle size distribution with a $d_{powder,10} \leq 1.6$ μm, a $d_{powder,50} \leq 3.3$ μm, and a $d_{powder,90} \leq 5.5$ μm.

11. The method of claim 9, wherein the spherical grinding media have an average diameter of 0.5 to 1.5 mm.

12. The method of claim 9, wherein the total grinding time is over 12 to 100 h.

13. The method of claim 9, wherein optionally size-classified iron pigments obtained after the grinding of the coarse iron powder are converted to a compact form.

14. A printing ink comprising the iron effect pigments of claim 1.

15. A coated article comprising the iron effect pigments of claim 1.

16. The iron effect pigments of claim 8, wherein the powder is a nondusting powder.

17. The iron effect pigments of claim 8, wherein the effect pigments are present as a paste or in compacted form.

18. The iron effect pigments of claim 17, wherein the effect pigments are present in compacted form and the compacted form is selected from the group consisting of granules, pellets, tablets, sausages and briquets.

19. The method of claim 13, wherein the compact form is selected from the group consisting of paste, granules, tablets, sausages, briquets and pellets.

20. Iron effect pigments wherein the iron effect pigments have a thickness distribution as determined via thickness counting by scanning electron microscopy (SEM) and represented as cumulative undersize distribution, with
    a) an $h_{50}$ having a range from 10 to 55 nm; and
    b) an $h_{90}$ having a range from 20 to 80 nm;
    wherein the iron effect pigments are present as powder, and wherein the powder is a nondusting powder.

* * * * *

UNITED STATES PATENT AND TRADEMARK OFFICE
CERTIFICATE OF CORRECTION

PATENT NO. : 8,709,146 B2  
APPLICATION NO. : 12/990256  
DATED : April 29, 2014  
INVENTOR(S) : Thomas Schlegl et al.

Page 1 of 1

It is certified that error appears in the above-identified patent and that said Letters Patent is hereby corrected as shown below:

On the Title Page, Item (73) should read

-- Eckart GmbH (DE) --

Signed and Sealed this  
Second Day of September, 2014

Michelle K. Lee  
*Deputy Director of the United States Patent and Trademark Office*

UNITED STATES PATENT AND TRADEMARK OFFICE
CERTIFICATE OF CORRECTION

PATENT NO.        : 8,709,146 B2          Page 1 of 1
APPLICATION NO.   : 12/990256
DATED             : April 29, 2014
INVENTOR(S)       : Schlegl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 511 days.

Signed and Sealed this

Twenty-ninth Day of September, 2015

Michelle K. Lee
*Director of the United States Patent and Trademark Office*